United States Patent [19]

Affinito et al.

[11] Patent Number: 4,868,549

[45] Date of Patent: Sep. 19, 1989

[54] FEEDBACK MOUSE

[75] Inventors: Frank J. Affinito, Ridgefield, Conn.; John F. Beetem, Madison, Wis.

[73] Assignee: International Business Machines Corporation, Armonk, N.Y.

[21] Appl. No.: 50,806

[22] Filed: May 18, 1987

[51] Int. Cl.$^4$ .......................... G06F 3/03; G06K 11/06
[52] U.S. Cl. ................................. 340/710; 340/709; 340/407
[58] Field of Search ............... 340/707, 709, 710, 706, 340/407; 178/18; 273/D28, 148 B; 74/471 R, 471 XY; 901/10; 188/161, 163; 303/20

[56] References Cited

U.S. PATENT DOCUMENTS

| | | | |
|---|---|---|---|
| 3,835,464 | 9/1974 | Rider | 340/324 A |
| 3,892,963 | 7/1975 | Hawley et al. | 250/231 R |
| 4,303,914 | 12/1981 | Page | 340/706 |
| 4,352,415 | 10/1982 | Powell | 188/163 |
| 4,364,035 | 12/1982 | Kirsch | 340/710 |
| 4,550,316 | 10/1985 | Whetstone et al. | 340/710 |
| 4,559,532 | 12/1985 | Hosogoe | 340/710 |
| 4,564,835 | 1/1986 | Dhawan | 340/710 |

FOREIGN PATENT DOCUMENTS

| | | | |
|---|---|---|---|
| 119437 | 7/1984 | Japan | 340/710 |
| 0081631 | 5/1985 | Japan | 340/710 |
| 116026 | 6/1985 | Japan | 340/710 |
| 0179821 | 9/1985 | Japan | 340/710 |

OTHER PUBLICATIONS

IBM Technical Disclosure Bulletin, vol. 27, No. 10B, Mar. 1985, p. 6299, "Mouse/Keyboard Concept Incorporating Unique Devices for Controlling CRT Display Cursors".

"New Role for 'Mice'" by J. Timothy Ohsann, Research Magazine, spring 1987, p. 22, IBM Corp., Thomas J. Watson Research Center, Yorktown Heights, N.Y. 10598.

IBM Technical Disclosure Bulletin, vol. 28, No. 3, Aug. 1985, p. 1343, "Seeing Eye Mouse" by L. Comerford.

Primary Examiner—Alvin Oberley
Attorney, Agent, or Firm—Roy R. Schlemmer

[57] ABSTRACT

A mouse for use in a video display system for controlling cursor movement on a display screen provided with feedback means which produces resistance to the motion of the mouse as the cursor moves across predetermined areas of the display screen. In its most straight forward realization it comprises an electromagnet and control circuit which operates independently of the pickup and location sensing control of the mouse to produce a magnetic field which acts cooperatively with a substantially planar magnetic surface to produce a resistance to the motion of the mouse when energized.

2 Claims, 4 Drawing Sheets

FIG.3 ANALOG MAGNET – DRIVER CIRCUIT

BINARY MAGNET-DRIVER CIRCUIT

FEEDBACK MOUSE

FIELD OF THE INVENTION

The present invention relates generally to the field of cursor controllable video display systems and more specifically to such systems wherein the movement of the cursor may be controlled by the motion of an operator movable input device or mouse due to the physical interaction of the mouse with a surface over which it is moved.

BACKGROUND OF THE INVENTION

Video display systems have become almost universal with modern day computers with the advent of cheaper cathode ray display tubes and the availability of raster scan displays provided with the requisite control functions, buffer memories, etc., required for sophisticated display capabilities. These displays may be used with either small stand alone computers, or for large central systems having large numbers of physically distributed workstations. As is well understood, the video display is a convenient form of system monitor which may readily be employed for the purpose of controlling the operation of the computer by an operator having minimal experience in sophisticated computer operation areas such as programming. Thus, with menu driven types of systems a display appears on the screen with a plurality of possible actions or options from which the operator must choose. This choosing or selection can, of course, be done by typing alphanumeric inputs with a keyboard as is well known; however, in recent years selection by positioning a cursor in the display at the option or action of choice has been found to be far quicker and easier to use from an operator's point of view. Thus, the cursor controller display is becoming increasingly important as a means of controlling the computer both in the area of text processing and also in the field of computer aided design and drafting systems where rapid movement and precise final location of the cursor is important.

Originally cursors were moved almost exclusively by means of up, down, right, left keys on a keyboard, but it has been found that a much more versatile type of cursor movement is possible with the mouse type of input device.

The mouse, as generally known in the art, utilizes motion over a surface wherein a sensing means located within the mouse is utilized to detect motion and, in effect, produce incremental signals which are applied through a straight forward system interface to produce motion of the cursor in the X or Y direction on the display screen. Usually the mouse is shaped to fit conveniently in the hand of an operator sitting at a console table and is frequently provided with several function control keys such as shown in U.S. Pat. No. 4,550,316. The only way that the operator has of knowing where the cursor is located on the screen is by actually viewing the cursor as it moves across the screen.

Many different types of mice are available at this point in time. Each generates the required cursor control signals based primarily upon motion of the mouse across a surface (usually planar); however, the particular interaction of the mouse with the surface has traditionally taken a wide variety of forms. In a first type of mechanical pickup mouse, the mouse comprises a housing supported for rolling motion upon two wheels or sets of wheels which are disposed at right angles to each other. Thus, as the mouse is moved across the surface the respective wheels will either roll or slide depending upon the direction of the motion of the mouse. The rotation of the wheels causes X-Y displacement signals to be produced and sent to the video display system. The signals are translated into movement of the cursor.

In a second type of mechanical mouse the wheels are replaced by a single sphere which contacts the surface on which the mouse is to move and two wheels or sets of wheels are located internally of the mouse which are in intimate contact with the sphere and translate the motion of the sphere into two quadrature X-Y signals which are similarly converted into electrical signals and utilized to control motion of the cursor on the screen. U.S. Pat. No. 3,892,963 of Hawley and U.S. Pat. No. 3,835,464 of Rider, respectively, disclose the two above described systems.

In other types of systems optical means have been utilized to produce the requisite motion signals as the mouse is moved across the surface and a light source and sensors, placed in various locations around the surface, pickup the motion of the mouse. Such a system is described in U.S. Pat. No. 4,364,035 of Kirch.

However, in all of the above described systems, the only feedback between the operator and the mouse is the visible feedback on the display screen wherein the operator watches the position of the cursor as mouse motion causes it to move across the display screen. It is believed that there is a need in this technical area for a mouse having a feedback means wherein a clearly recognizable indication is fed back to the mouse that is apparent to the operator when the movement of the mouse has caused the cursor "to arrive" at some predetermined position or neighborhood on the screen. Thus, in a menu type of system the feedback would indicate to the operator that he had correctly positioned the mouse in a selection square or box on the screen. Alternatively, if some sort of computer assisted design work were being done a "resistance to motion" feedback of the mouse would indicate, for example, that the cursor had reached a particular line or lines on the screen and that the cursor was precisely oriented with respect thereto. Such a functional capability would free the operator from having to continually watch the screen especially where it was necessary for him to be concurrently viewing something else such as a template on the planar surface or some other material necessary to the application at hand. No systems are currently available which provide for the generation of such resistance-to-motion feedback to the mouse which may be physically perceived by the user.

The expression "resistive feedback" as used herein means, any resistance-to-motion feedback signal to the mouse which produces a user discoverable resistance to the motion of the mouse.

DESCRIPTION OF THE PRIOR ART

No patents are known to applicants disclosing or suggesting a motion-resistive feedback mouse as taught by the present invention.

The following two patents are cited, in addition to the three discussed above as background art, in that they are exemplary of mouse controlled cursor movement systems in an overall video display system.

U.S. Pat. No. 4,303,914 of Page disclosed a typical input mouse for controlling the position of the cursor on an associated display screen by moving the mouse over a slightly roughened planar surface. Means are provided to generate electrical pulses of a particular polarity to effect movement of the cursor on the screen.

U.S. Pat. No. 4,550,316 of Whetstone et al. discloses a somewhat similar mouse to the one described above in that transducers detect quadrature direction signals in response to a stylus being used on a planar surface.

Both of the above systems relate to a signal input mouse and neither suggests any resistive feedback means for alerting the operator that the cursor on the screen is approaching or is at a predetermined location.

The following two publications both relate to a mouse system having a braille cell mounted on the mouse which allows a braille pattern to be raised when the cursor intercepts an alphanumeric character on the CRT screen. The system includes complicated table look-up algorithms to access the character stored at the X-Y location of the cursor and neither discloses nor suggests any mechanism for providing a resistance to motion of the mouse. "New Role for 'Mice'" by J. Timothy Ohsann, appearing in the Research magazine, Spring '87, page 22, available from the IBM Corporation, Thomas J. Watson Research Center, Yorktown Heights, New York 10598. An article by Liam Comerford entitled "Seeing Eye Mouse", IBM Technical Disclosure Bulletin, Vol. 28, No. 3, Aug. 1985.

SUMMARY AND OBJECTS OF THE INVENTION

It is a primary object of the present invention to provide a resistive feedback mouse for use with a cursor controlled video display system.

It is a further object of the present invention to provide such a mouse wherein a resistive feedback detectable by an operator is produced when the cursor whose position is controlled by the mouse reaches predetermined positions on the display screen.

It is a further object of the present invention to provide such a mouse wherein the feedback comprises a pronounced resistance to the motion of the mouse as it is moved across a control surface.

It is yet another object of the present invention to provide such a mouse wherein the control surface or pad is a magnetic material and the resistive feedback means comprises a selectively energizable electro-magnet mounted within the mouse which produces a strong magnetic field which causes increased resistance to further movement of the mouse across the surface.

It is another object of the invention to provide suitable control circuitry actuable by the video controller for producing suitable electrical "control signals" for energizing the electro-magnetic mouse.

The objects of the present invention are accomplished in general by a video display system having a display screen, a computer for controlling video display operations and a mouse for controlling a cursor on the display screen by movement of the mouse across a surface. The mouse of the present invention is unique in having feedback means, which may be totally separate from the movement pickup means, and which transmits to an operator a resistance to movement of the mouse as the cursor controlled thereby approaches or reaches a predetermined point on the screen.

In a preferred embodiment of the invention the feedback responsive means comprises an electro-magnet mounted in the mouse adjacent to a ferro magnetic surface over which the mouse is moved whereby energization of the electro-magnet produces a strong magnetic field which is turn produces a force proportional to the intensity of the magnetic field to be exerted between the mouse support slides and the ferro magnetic surface thereby increasing friction and resistance to further motion of the mouse. The energizing circuitry may be either binary (e.g., on or off) or analog whereby a varying resistance to motion would be produced to provide an indication to the operator that the cursor is approaching a predetermined location on the screen.

It should be clearly understood that the feedback responsive means utilized in the mouse of the present invention may be completely separate from an functionally unrelated to the particular means employed within the mouse for sensing motion of the mouse.

DESCRIPTION OF THE PREFERRED EMBODIMENT

Figure 1:
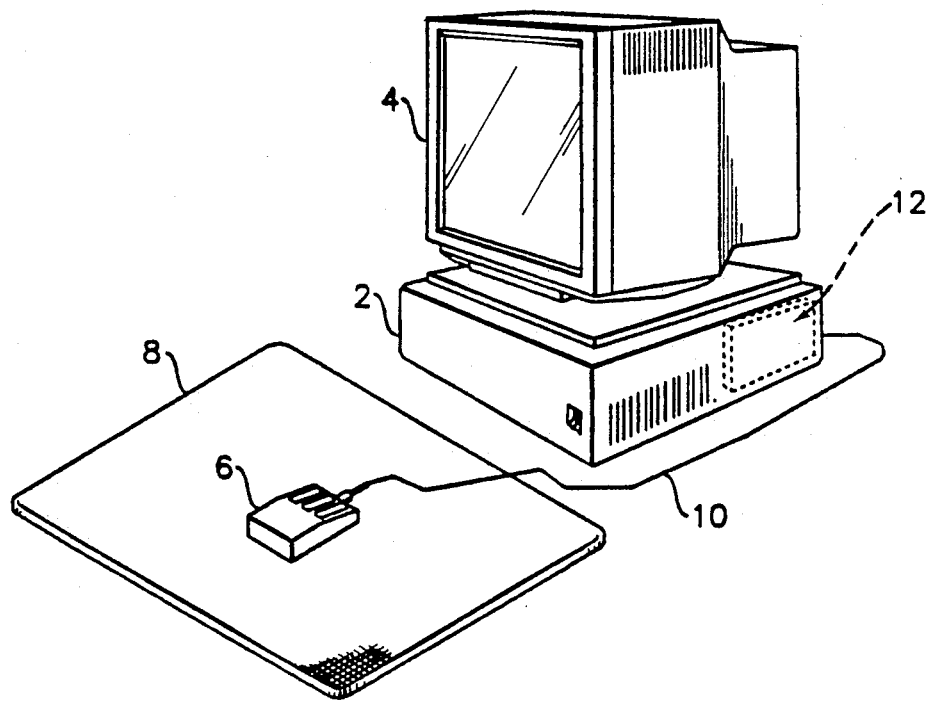
FIG. 1 is a perspective view of a computer work station comprising a display, a computer console, and a mouse/pad assembly.

The resistive feedback mouse of the present invention preferably uses an electro-magnet inside a standard mechanical or optical mouse to provide the requisite resistance to motion under computer control. As stated previously, a conventional mouse is a device used in conjunction with certain video display systems marketed by IBM and others for providing X-Y coordinate input data to the display system by moving the mouse over a planar surface. Such mice are difficult to position precisely with respect to screen objects, such as a grid, as all points feel the same to the user. Thus, the positioning requires the operator to carefully watch the cursor on the screen. According to the present invention, by selectively energizing the electro-magnet using appropriate software, the resistive feedback mouse alters the apparent texture of the flat surface. It will of course be noted that the flat surface must be a ferro magnetic material in order for the preferred embodiment of the invention to work. Thus, if the magnet is energized at grid lines, the user will "feel" the grid as the mouse causes the cursor to pas over the individual lines whereby the cursor may be more precisely located on the grid.

In graphic editing applications the mouse could be used to designate a graphic element on the screen which requires a change, etc. As will be apparent from the following description of the present invention, it will be seen that the resistive feedback mouse described herein provides a powerful and flexible feedback function at a very low cost.

The resistive feedback mouse can be incorporated into any mouse-oriented work station environment. An example of this is an IBM Personal Computer APA (All Points Addressable) display operating within a mouse-oriented environment such as IBM Top View. The Microsoft Corporation and Digital Research Inc. make similar mouse-oriented workstation products.

The preferred embodiment of the present invention comprises a magnetic version of the resistive feedback mouse and more particularly one wherein an electro magnet is located within the body of the mouse and interacts with a ferro magnetic planar surface over which the mouse moves. Other possible embodiments will be discussed briefly subsequently. The details of the required additional hardware for supporting the magnetic version of the feedback mouse will be set forth in more detail subsequently; however, it would consist of at least a magnet driver circuit to energize the electromagnetic circuit, which would typically consist of an amplifier and finally a driver stage to provide the required coil current in the magnet.

The amplifier can be either analog or binary (on/off). The binary amplifier is simpler but only allows the mouse to be fully energized or de-energized. An analog amplifier control circuit allows the resistive feedback to have a varying magnitude. This could produce a ramp effect or gradual increase to resistance to motion as the cursor approaches some predetermined area of the screen. The power for the magnet driver circuit could either be extracted directly from the work station or from an external power supply provided therefor. The magnet driver circuit would be interfaced to the workstation through either a single bit of the interface for the binary implementation or through an analog port where analog control of the mouse is required.

The mouse control software on the workstation must be adapted to support the resistive feedback mouse. However, as will be seen from the following, this control would be very simple and straight forward. The mouse control software on conventional workstations currently performs the following services. Whenever the user moves the mouse, the new X-Y coordinates are computed and made available to the workstation software. This function is performed automatically using a combination of hardware and software. Enhancing the function of the mouse control software with the resistive feedback mouse would be quite simple. All that is needed for the workstation software to compute is a "magnetization function" M(x,y), which for every coordinate pair (x,y) on the screen indicates to what degree the resistive feedback mouse should be energized (magnetized). For binary control of the mouse this will of course be a single bit binary function of "one" or "zero" for on or off. For an analog embodiment, this would be a multi-valued function (e.g., 8 bits). The mouse control software would then be modified as follows: when ever new (x,y) coordinates are computed, M(x,y) is computed and its value is sent to the magnet driver to change the level of magnetization as appropriate. It should be noted that a particular application does not have to control the magnet driver. This could all be incorporated basically in the systems support software. The feedback function could either be set on or off and, in the case of an analog function, a threshold could easily be set below which mouse feedback circuitry would be de-energized.

For many applications, the resistive feedback mouse would be used to provide a feedback relative to graphics on the screen. For such applications, all that would be required of the mouse control circuitry would be to energize same when the mouse is pointing at visible graphics (such as text or grid lines) and to de-energize the mouse feedback circuitry and when pointing at empty space (such as between words or text lines). In these cases a very simple magnetization function called a "neighborhood function" can be used. The neighborhood function N(x,y) merely looks at the graphics in a close neighborhood of coordinate (x,y) representing the current position of the cursor. For example, it examines the 3 by 3 pixel square around (x,y) and computes the ratio of visible graphics to blank space. By energizing the feedback circuitry to the mouse whenever this ratio is high, the desired resistive effect is achieved. The binary version of the control circuitry is energized if the neighborhood ratio is above a certain threshold, whereas the analog version could produce an energization in proportion to the ratio. The chief advantage of using the neighborhood function as a magnetization function is that it can be computed automatically with the mouse control software. The user does not have to provide a magnetization function at all. Application software which effects to use the neighborhood function does not have to be modified at all to gain the advantage of the herein described feedback mouse. The system could be easily arranged so that the neighborhood function would be the default feedback function if no other was specified.

Advanced applications which wish to provide more than merely feedback of visible graphics must specify a magnetization function. An example of this is where there is an invisible grid which, although not displayed, could still be felt using the resistive feedback mouse. Another such application might be a furniture moving simulator, where the mouse is energized in proportion to the weight of the furniture to be moved. Since any M(x,y) can be computed by the application there is no limit to the ways in which the resistive feedback mouse can be used.

There will now follow a specific description of the herein disclosed preferred embodiment of the present resistive feedback mouse.

FIG. 1 is a diagram of a small computer system comprising a computer 2, a computer display 4, a mouse 6, a pad 8 which provides a working surface for the mouse, a cable 10 which provides the electrical connections between the mouse and the magnet-driver brake energizer circuit module 12. The circuit module is mounted in the rear of the computer in a slot normally provided for interfacing a computer to peripheral devices.

Figure 2:
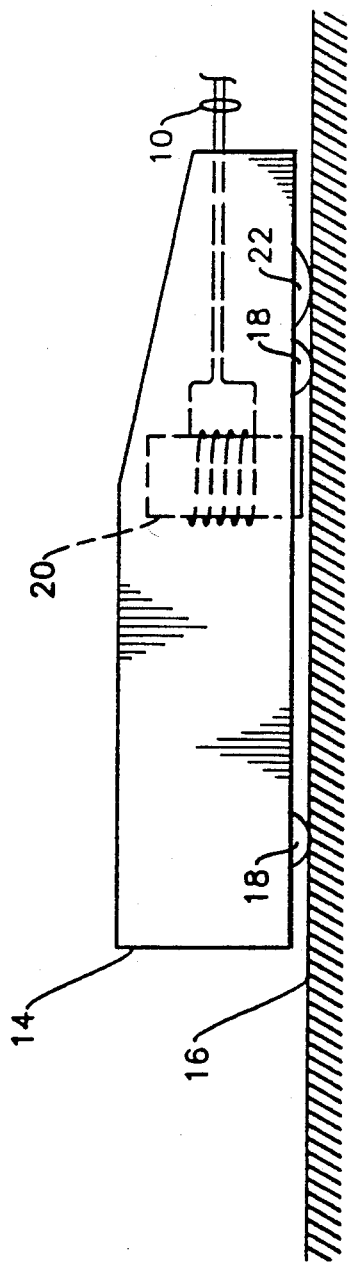
FIG. 2 is a cross-sectional view of a preferred embodiment of an electro magnetic resistive feedback mouse constructed in accordance with the teachings of the present invention.

FIG. 2 is a side elevation cut away view of the mouse employing magnetic means to achieve resistive feedback. The magnetic version of the mouse according to the invention generally comprises the housing 14 adapted for supported sliding movement on a specific magnetic pad surface 16 by means of slide pads 18 which are affixed to the underside of the housing. Mounted within the housing 14 and physically attached thereto is an electro-magnet 20 positioned with the bottom pole located in close proximity to the magnetic pad surface 16. Cable 10 provides the electrical connection between electro magnet 20 and the magnet driver circuit located in the magnet driver brake energizer circuit module 12 which is mounted within the computer 2. As with conventional mice, there is contained within the mouse housing 14 a tracking mechanism 22 which, in cooperation with hardware and software located elsewhere within computer 2, provides for conventional operator control of the movement and positioning of the cursor on the computer display 4.

The mouse, according to the invention, provides for resistive feedback to the operator of the mouse under computer control. With reference to FIG. 2, resistive feedback is achieved by controlling the degree of sliding friction between the slide pads 18 and the magnetic pad surface 16. Sliding frictional forces arise at the points of contact between the tips of the slide pads 18 and magnetic pad surface 16 whenever the mouse is in motion across magnetic pad surface 16. These forces occur in the plane of magnetic pad surface 16 and are oriented in a direction opposite that of the direction of movement of side pads 18 across magnetic pad surface 16. Thus, the frictional forces arising during movement of the mouse across the magnetic pad surface occur in an orientation so as to directly oppose further movement. The magnitude of the sliding frictional force at a given slide pad is dependent upon the product of the co-efficient of sliding friction and the magnitude of the downward force at the slide pad normal to magnetic pad surface 16. Thus, by varying the degree of magnetization of electro magnet 20, the magnitude of the downward normal forces at the slide pads 18 may be varied, thereby varying the magnitude of the sliding frictional forces occurring between slide pads 18 and magnetic pad surface 16, which in turn varies the degree of resistance to further sliding of the mouse housing 14 across magnetic surface 16 experienced by the operator. The degree of magnetization of electro magnet 20 is controlled by the magnitude of the electric current supplied thereto via cable 10 by the magnet driver circuit.

A magnetic resistive feedback mouse according to the invention may be operated in a linear (proportional) or a nonlinear (on/off) mode, said mode being determined by the nature of the magnetization current supplied to electro magnet 20. In the linear mode, the magnet driver circuit would be capable of supplying a continuously variable current under computer control. Operation in the nonlinear or binary (on/off) mode would require that the magnet driver circuit be capable of supplying a fixed magnitude current which may be turned on or off under computer control.

Figure 3:
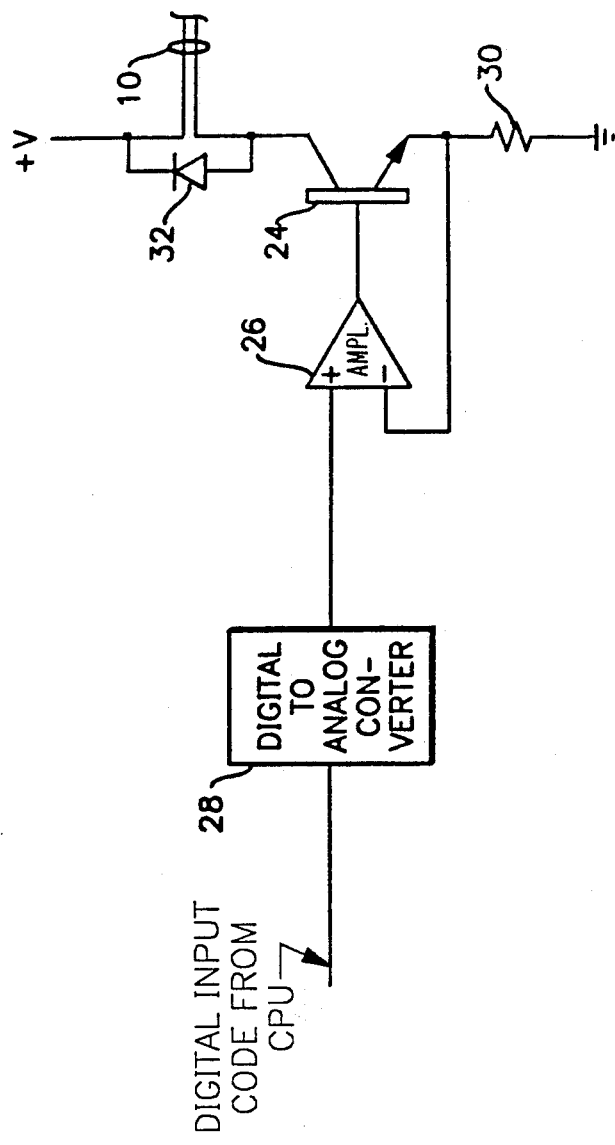
FIG. 3 is a functional schematic diagram of an analog control circuit for the mouse of FIG. 2.

FIG. 3 is a diagram of a magnet driver circuit suitable for operating a magnetic feedback resistive mouse in the linear or proportional mode. The circuit comprises a power transistor 24, an operational amplifier 26, a digital-to-analog converter 28, a sense resistor 30, and protection diode 32. At the left of the diagram the digital-to-analog converter 28 receives a digital input code from the Central Processing Unit or CPU which is part of computer 2, and produces a proportional analog voltage at its output which is then supplied to the positive input of operational amplifier 26. Operational amplifier 26, in conjunction with power transistor 24 and sense resistor 30, form a closed loop voltage-to-current converter circuit. The degree of conduction of power transistor 24 is controlled by operational amplifier 26 which compares the magnitude of the voltage drop across sense resistor 30 with the analog voltage received from digital-to analog converter 28. Thus, the current from the positive voltage source, V+, through cable 10 to electro magnet 20, through power transistor 24 and sense resistor 30 to ground, is made to correspond in magnitude to the digital input code from the CPU. The instantaneous degree of resistance experienced by the operator of the magnetic resistive feedback mouse to motion along magnetic pad surface 16 is controlled in this manner by the digital input code supplied from the CPU residing within computer 2. Protection diode 32 protects power transistor 24 against exposure to excessive back-emf that would occur if electro magnet 20 were rapidly de-energized.

Figure 4:
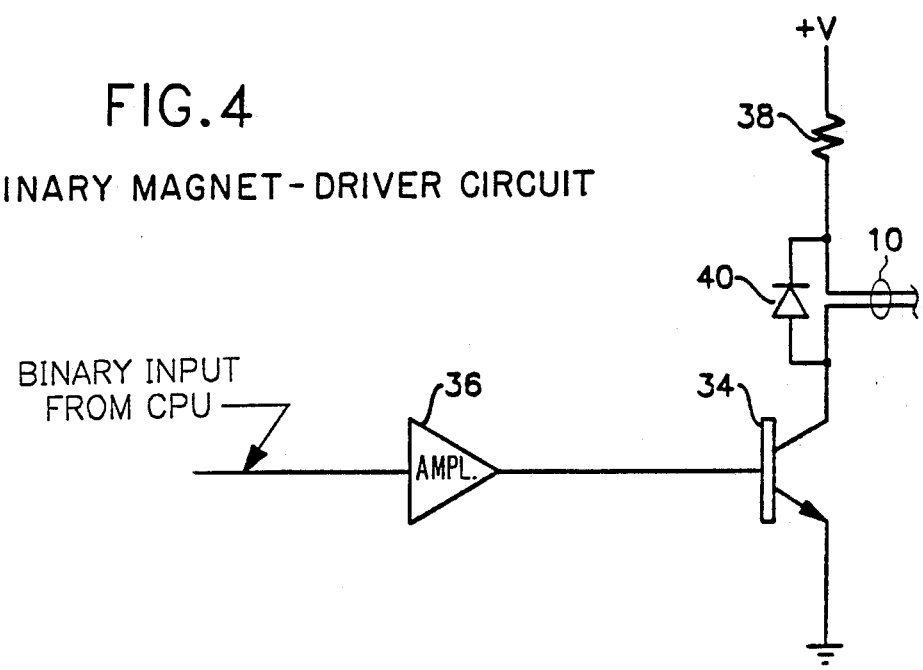
FIG. 4 is a functional schematic diagram of a binary digital control circuit for the mouse of FIG. 2.

FIG. 4 comprises a diagram of a magnetic driver circuit suitable for operating the magnetic resistive feedback mouse in the nonlinear or on/off mode. Power transistor 34 functions as an on/off switch under control of binary amplifier 36 which in turn receives an input from the Central Processing Unit residing in computer 2. When a binary input from the CPU is received corresponding to the off condition, binary amplifier 36 applies a voltage to power transistor 34 which places it in the nonconducting state. Consequently no current is supplied to electro magnet 20. When a signal is received from the CPU corresponding to the "on" condition, binary amplifier 36 applies a voltage to power transistor 34 placing it in the fully conducting state. A current is established from the positive supply, V+, through current limiting resistor 38, through cable 10 to electro magnet 20, and through power transistor 34 to ground. Current limiting resistor 38 is included to establish the magnitude of the on-state current, and protection diode 40 serves to protect power transistor 34 against potentially destructive voltage transients as described previously.

Figure 5:
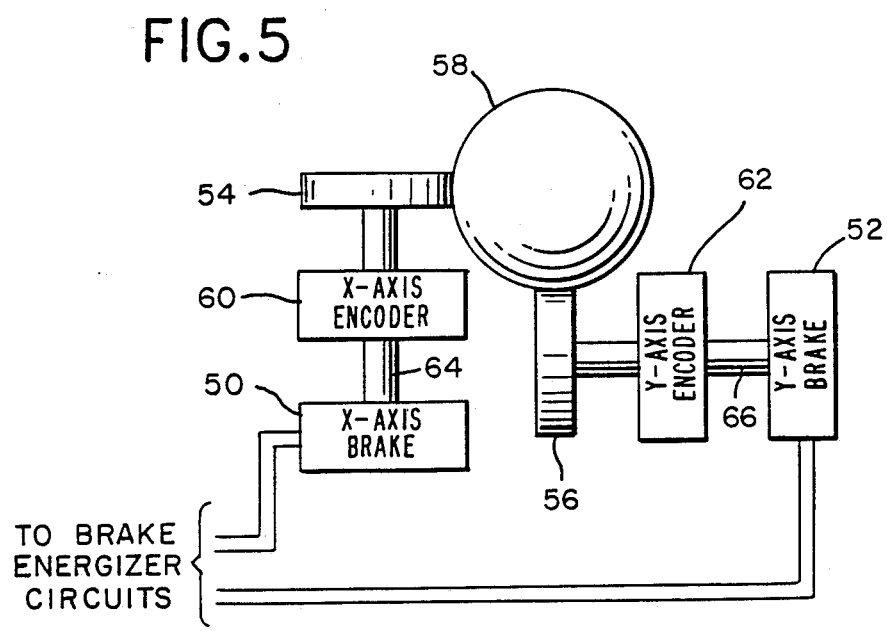
FIG. 5 is a diagram illustrating an alternative embodiment of a magnetic braking arrangement for use with a mouse provided with a spherical ball tracking element, said mouse being suitable for use on a non-specific surface.

FIG. 5 is a functional block diagram of an alternative embodiment of the resistive feedback mouse of the present invention. In this embodiment, electro magnetic brakes 50 and 52, totally self-contained within the mouse, enable a controlled braking effect to be applied directly to the spherical tracking element 58, thereby producing resistance-to-motion feedback. Thus, the embodiment of FIG. 5 eliminates the need for a ferromagnetic work surface, and may be utilized with a mouse which is adapted to be movable on any non-specific surface.

The embodiment of FIG. 5 could utilize a mouse having a spherical ball pickup such as disclosed in U.S. Pat. No. 3,835,464 of Rider. In this embodiment the x-axis electro magnetic brake 50 and the y-axis electro magnetic brake 52 are shown mechanically attached to the x-axis motion pickup wheel 54 and the y-axis motion pickup wheel 56, respectively. The two pickup wheels are in turn located with respect to the spherical tracking element 58 to detect quadrature rotations of the spherical tracking element. As stated previously the basic pickup system utilizing an x-axis motion encoder 60 and y-axis encoder 62 are essentially unaffected by the details of the present invention. It would of course be necessary for the shaft extension 64 and 66 to be provided for the purposes of mounting simple electro magnetic brakes 50 and 52. As will be apparent, a braking signal applied to either or both of the magnetic brakes would cause a resistance to motion of the mouse in either or both the X and Y directions. The circuitry for generating the braking pulses could be identical to those described previously, e.g., the analog magnet driver circuit of FIG. 3 could be utilized or the binary magnetic driver circuit of FIG. 4 could be used. Similarly, the X and Y brakes could be driven in parallel utilizing the software functions described previously, or they could be driven separately by separate driver circuits utilizing magnetization functions which considered only the X or Y coordinates for deriving the braking function.

In addition to the embodiment of FIG. 5 it will be course be obvious that the braking concept of FIG. 5 could easily be adapted to a two wheel mouse such as described previously wherein the X and Y motion pickup wheels directly contact the surface as opposed to being driven by the motion of the spherical tracking element as in FIG. 5.

Other possible embodiments of the present invention to produce resistive, operator-discernible feedback might include an on-off solenoid having a vertically-disposed movable element which would, in effect, act as a mechanical brake when energized.

The position detection and resistive feedback signal generating circuitry for producing resistance to motion would be essentially the same as for the previously described embodiments as will be well understood by those skilled in the art.

Other modifications and changes could be readily made by those skilled in the art without departing from the spirit and scope of the present invention as set forth in the appended claims.

Having thus described our invention, what we claim as new, and desire to secure by Letters Patent is:

1. In the combination of a display system including a display screen, a video display controller and an input mouse including means cooperable with the display controller for moving a cursor on the display screen in response to motion of the mouse, the improvement which comprises a resistive feedback system detectable by the user of the mouse including:
    electromagnetic means for producing an operator-discernible resistance to the motion of the mouse, as the cursor on the screen, whose motion is controlled by said mouse, moves across predetermined locations on the screen of said display, and
    control signal generating circuitry in the display controller for producing a control signal when the cursor reaches predetermined locations on the screen, and
    wherein the surface over which the mouse is to move is non-specific and the means for sensing motion of the mouse includes a spherical ball contacting said surface and being rotatable when said mouse is moved and two pickup wheels in frictional contact with said ball at a location remote from said surface for detecting motion of the ball along the X and Y axes thereof, the electromagnetic means for producing resistance to the motion of the mouse comprising electromagnetic braking elements physically connected to resist axial movement of the X and Y frictional pickup wheels when energized, and
    brake energization circuitry actuable in response to said control signal for selectively energizing said electromagnetic braking elements,
    said control signal generating circuitry further including,
    means for producing said control signal as a digital "magnetization function" signal of a magnitude proportional to the desired resistance to motion of the mouse as it approaches a predetermined location on the screen,
    a digital-to-analog converter (D/A) for producing an analog signal from said digital magnetization function, and
    a magnet driver circuit comprising:
    an operational amplifier (op-amp) connected to the output of the D/A converter,
    a power transistor, which supplies energization current to the magnet under control of the op-amp,
    a protection diode connected in parallel with the electro-magnet, and
    a sense resistor in the emitter circuit of the power transistor for providing control information to said op-amp.

2. A display system as set forth in claim 1, said control signal generating circuitry including means actuable for analyzing the display signal contiguous to the current position of the cursor, and
    means for continuously computing a neighborhood magnetization function for the cursor whose magnitude is proportional to a number of visible objects on the screen within a predetermined distance from the cursor, and
    means actuable in response to said neighborhood magnetization function to cause said control signal generating circuitry to produce said control signal having a magnitude proportional to the magnitude of said neighborhood magnetization function.

* * * * *